United States Patent [19]

Himi

[11] Patent Number: 4,588,135
[45] Date of Patent: May 13, 1986

[54] MOUNTING MEANS FOR CUTTING BLADE OF FOOD-CUTTING APPARATUS

[75] Inventor: Kohei Himi, Mie, Japan

[73] Assignee: Chubu Industries, Inc., Mie, Japan

[21] Appl. No.: 678,200

[22] Filed: Oct. 4, 1984

[30] Foreign Application Priority Data

Jul. 31, 1984 [JP] Japan .................. 54-117481

[51] Int. Cl.⁴ .............. B02C 17/02; B26D 7/06; B07B 13/00
[52] U.S. Cl. .......................... 241/84; 241/95; 241/242; 241/287; 83/403
[58] Field of Search .............. 241/84, 95, 231, 237, 241/239, 240, 241, 242, 257 R, 286, 287, 285 R, 292.1, DIG. 17; 83/403, 411 R, 425

[56] References Cited

U.S. PATENT DOCUMENTS 4,055,099 10/1977 Mitsubayashi .................. 241/95 X Primary Examiner—Howard N. Goldberg
Assistant Examiner—Timothy V. Eley
Attorney, Agent, or Firm—Fulbright & Jaworski

[57] ABSTRACT

This is a food-cutting apparatus wherein: a cutting blade is disposed on a back surface of a cutting plate so as to protrude its front tip from an opening provided in the cutting plate; the cutting plate is disconnectably mounted on a mounting plate having a saddlelike engaging recess at its middle portion; the mounting plate engages at its engaging recess rotatably with a supporting rod interposed between a pair of arms provided on the supporting plate which is provided in a back side of the cutting plate; a width of the cutting blade is shorter in dimension than a length of an interval between the pair of arms; and, interposed between a rear portion of the mounting plate and the supporting plate are a spring and an adjusting means for adjusting a protruding amount of the front tip of the cutting blade.

1 Claim, 7 Drawing Figures

MOUNTING MEANS FOR CUTTING BLADE OF FOOD-CUTTING APPARATUS

BACKGROUND OF THE INVENTION

1. Field of the Invention

The present invention relates to a mounting means for a cutting blade of a food-cutting apparatus for solid foods such as an ice block, frozen fruits and the like.

2. Description of the Prior Art

An outlne of a typical food-cutting apparatus to which a mounting means for a cutting blade according to the present invention is applied is shown in FIG. 1, the detail of which apparatus is disclosed in Japanese Patent application No. 33994/1984 filed Feb. 24, 1984 by an assignee of the present application, and will briefly be described hereinbelow with reference to the drawings in which like reference characters or numerals designates like parts, in which: the numeral 1 designates an upper frame; 2 designates a boss provided in a central portion of a back surface of the frame 1; 3 designates a cylindrical shaft housing; 4 designates a rotary shaft; 5 designates a pulley fixed to a lower end of the rotary shaft 4; 6 designates a supporting arm; 7 designates a driving electric motor; 8 designates a pulley mounted on a shaft of the electric motor 7; 9 designates a belt running under tension round the pulleys 5 and 8; 11 designates a cutting plate; 12 designates an opening provided in the cutting plate 11; 13 designates a cutting blade provided so as to protrude its front tip from the opening 12; 15 designates a transfer rotor; 16 designates a boss; 17 designates a bush; 18 designates a nut; 20 designates a hopper; 21 designates an anti-scatter cover disposed over the hopper 20; 22 designates a head cover disposed above the anti-scatter cover 21; 23 designates an opening provided at a top portion of the head cover 22; 24 designates a lid for covering the opening 23; 26 designates a safety switch; 27 designates a main switch; 28 designates a discharge chute; and 29 designates a cover.

The above-mentioned food-cutting apparatas is so constructed that, when its food-cutting operation is finished, it is possible to wash out a residue of cut foods adhered to the transfer rotor 15 and the cutting plate 11 by opening the lid 24, removing in turn the head cover 22 and the anti-scatter cover 21, and then dismounting the transfer rotor 15 and the cutting plate 11 from the frame 1.

On the other hand, FIG. 2 shows a conventional mounting means 32 for the cutting blade 13, with the use of which mounting means 32 the cutting blade 13 is mounted on the food-cutting apparatus. Namely, the supporting plate 34 is fixed to a back surface of the cutting plate 11 near the opening 12 through mounts 33 by means of bolts 35, and a pair of arms 36 are provided on a reverse side surface of the supporting plate 34 with respect to the cutting plate 11, a supporting rod 37 is interposed and axially supported between the front ends of the arms 36. The supporting rod 37 is interposed in a metal boss portion 39 of a mounting plate 38 for the cutting blade 13. The cutting blade is fixed to a front bent portion of the plate 38 by means of bolts 40. Another bolt 42 is so provided that a threaded front portion thereof engages with a female screw (not shown) of an adjusting knob 45 through an opening 43 provided in a rear portion of the mounting plate 38 to adjust a protruding amount of the front tip of the cutting blade 13 from the opening 12 by rotating the adjusting knob 45 to slightly rotate the mounting plate 38 for the cutting blade 13 around the supporting rod 37 acting as a center for the rotation. The reference numeral 46 designates a spring interposed between the supporting plate 34 and the mounting plate 38 for the cutting blade 13 around the bolt 42.

It is possible to dismount the thus constructed conventional mounting means 32 for the cutting blade 13 together with the cutting plate 11 when the cutting plate 11 is dismounted in the above-mentioned manner. After that, though it is preferable to wash out adhered substances such as fruit juices, dust and the like adhered to the opposite inner surfaces of the mounting plate 38 for the cutting blade 13 and the supporting plate 34 after both of these members 38, 34 are disassembled. It is not possible to disassemble these two members 38, 34 due to a construction of the supporting rod 37 interposed and axially supported between the pair of arms 36. This leads to an incomplete wash-out of the substances adhered to both of the members 38, 34 causing unsanitary conditions for foods in the conventional food-cutting apparatus.

SUMMARY OF THE INVENTION

Consequently, an object of the present invention is to provide a mounting means for a cutting blade of a food-cutting apparatus for solid foods, which mounting means enables a mounting plate for the cutting blade and a supporting plate to be disassembled from the apparatus so as to wash out substances adhered to both of the above-mentioned members completely to resolve the the trouble inherent in the conventional food-cutting apparatus.

For accomplishing the object of the present invention, according to the present invention, a food-cutting apparatus is so constructed and characterized in that: the supporting plate is fixed to a back surface of a cutting plate near an opening thereof; a pair of arms are provided on a reverse side surface of the supporting plate with respect to the cutting plate; between the pair of arms a supporting rod is interposed and axially supported; an engaging recess formed in a middle portion of a mounting plate for the cutting blade is rotatably mounted on the supporting rod in a saddling-up manner at a side of the supporting rod opposite to the supporting plate; in a front portion of the mounting plate for the cutting blade the cutting blade is disconnectably connected; a length of the mounting plate for the cutting blade between opposite ends of the mounting plate is shorter than that of an interval between the pair of arms; a spring means is interposed between the mounting plate for the cutting blade and the supporting plate behind the engaging recess; and an adjusting means for adjusting a protruding amount of a front tip of the cutting blade is disconnectably connected between a rear portion of the mounting plate for the cutting blade and the supporting plate.

Namely, according to the present invention, since the supporting rod is engaged at its side facing the supporting plate with the engaging recess formed in the middle portion of the mounting plate and the length of the mounting plate is shorter than that of the interval between the pair of arms to enable the mounting plate to be pulled out of the food-cutting apparatus, it is possible to disassemble the mounting plate from the supporting plate after the cutting plate is removed and the adjusting means for adjusting the protruding amount of the front tip of the cutting blade into the opening of the cutting plate is also removed to pull out easily the mounting plate which engages with the supporting rod at its engaging recess. Consequently, it is possible to completely wash out the adhered substances adhered to the opposite inner sides of the mounting plate and the supporting plate and the like when the cutting blade is washed out. This enables the food-cutting apparatus of the present invention to provide sanitary cut foods and to be assembled and disassembled in a easy manner in a brief time to enhance a workability of the apparatus of the present invention.

DETAILED DESCRIPTION OF THE PREFERRED EMBODIMENTS

Figure 1:
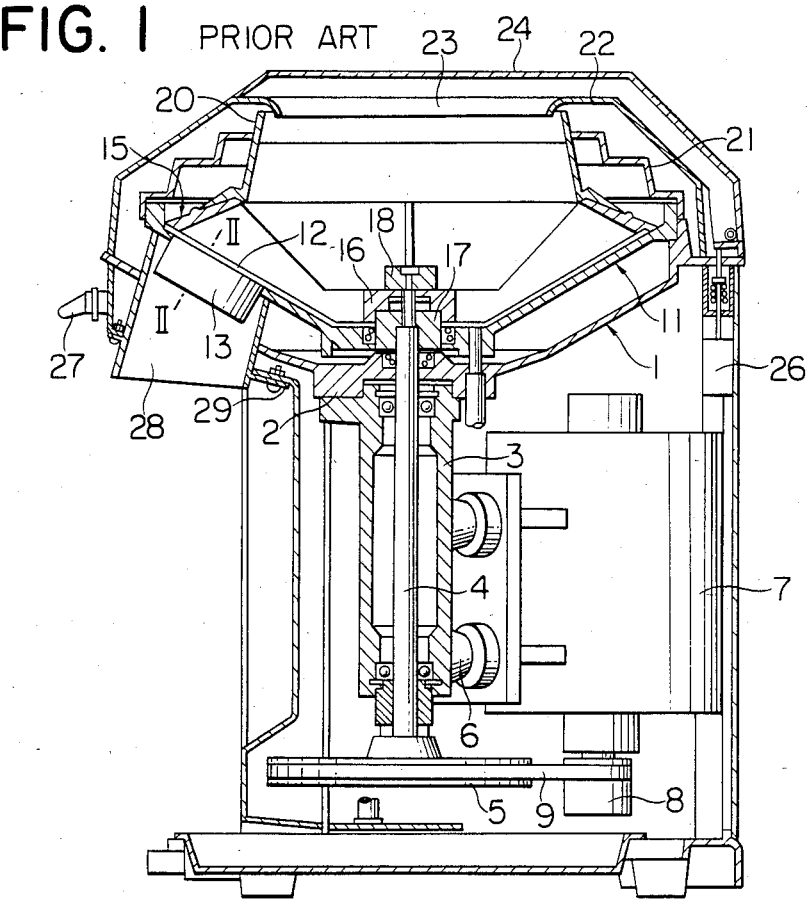
FIG. 1 is a longitudinal sectional view of an example of the food-cutting apparatus to which a mounting means for the cutting blade of the present invention is to be applied.
Figure 2:
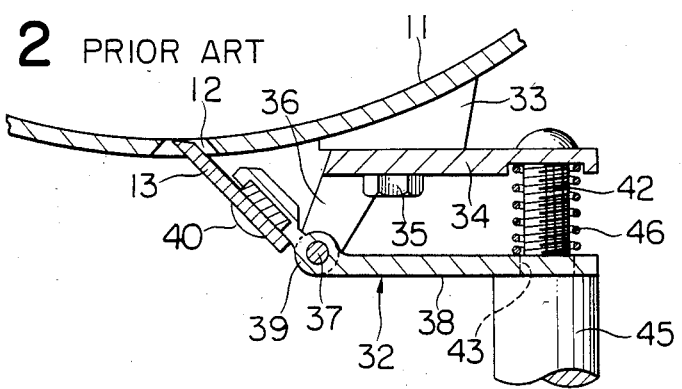
FIG. 2 is an enlarged sectional view of the conventional mounting means for the cutting blade taken along the line II—II of FIG. 1.
Figure 3:
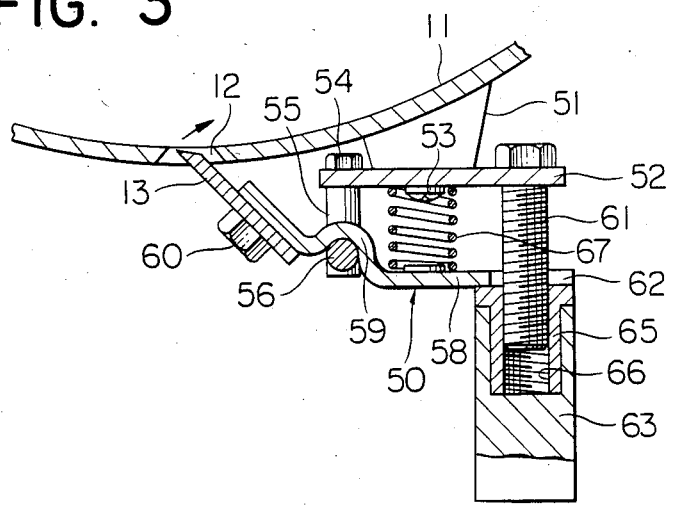
FIG. 3 is a like sectional view as is FIG. 2, of an embodiment of a mounting means for the cutting blade according to the present invention.
Figure 4:
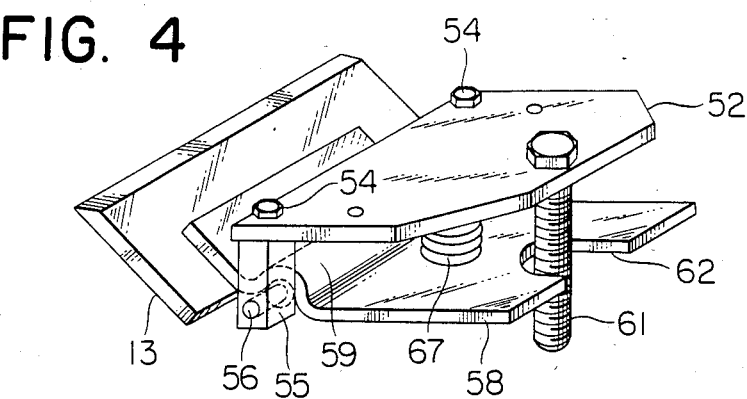
FIG. 4 is a perspective view of the embodiment shown in FIG. 3.
Figure 5:
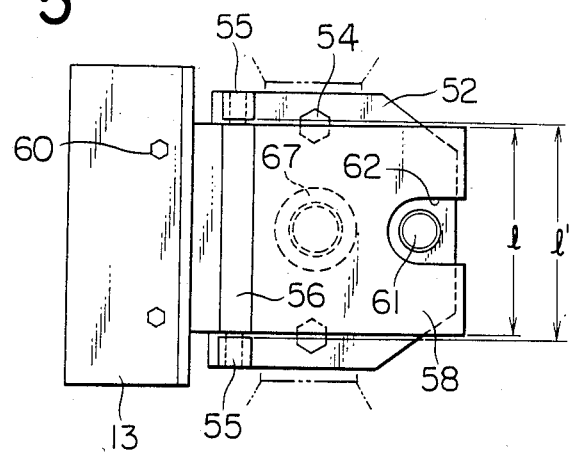
FIG. 5 is a bottom view of the embodiment shown in FIG. 4.

As shown in FIGS. 3 to 5, the reference numeral 50 designates a mounting means for a cutting blade 13, in which means 50 includes a supporting plate 52 fixed to a back surface of a cutting plate 11 near an opening 12 thereof through mounts 51 by means of bolts 53. A pair of arms 55 are fixed to a reverse side surface of the supporting plate 52 with respect to the cutting plate 11 by means of other bolts 54, between which pair of arms 55 a supporting rod 56 is axially supported by inserting its opposite ends into holes provided in inner surfaces of front ends of the pair of arms 55. A circular arc-shape engaging recess 59 formed in a middle portion of a mounting plate 58 for the cutting blade 13 is mounted on the supporting rod 56 in a saddling-up manner at a side of the supporting rod 56 opposite to the supporting plate 52. Plate 58 rotates around the supporting rod 56. As shown in FIG. 5, since a length l of the mounting plate 58 between opposite ends thereof is shorter than that l' of an interval between the pair of arms 55, it is possible to pull out the engaging recess 59 forward (leftward in FIG. 5) from a position between the pair of arms 55 by disengaging the recess 59 from the supporting rod 56.

To a front bent portion of the mounting plate 58 the cutting blade 13 is disconnectably connected by means of bolts 60. The supporting plate 52 is provided with a bolt 61 having a threaded front portion which engages a female screw 66 of a sleeve 65 inserted into an end bore of an adjusting knob 63 through a notch 62 provided in a rear portion of the mounting plate 58 for the cutting blade 13. The reference numeral 67 designates a spring which is interposed between the supporting plate 52 and the mounting plate 58 to urge the mounting plate 58 to the supporting rod 56.

When a washing of opposite inner surfaces of the mounting plate 58 and the supporting plate 52 for removing the substances adhered to the above-mentioned inner surfaces and the like is required in the food-cutting apparatus, the bolts 60 are first removed to dismount the cutting blade 13 from the mounting plate 58 therefor, and then the adjusting knob 63 is turned in a releasing direction thereof to disengage the threadable connection between the threaded portion of the bolt 61 and the female screw 66 of the sleeve 65. After that, when the spring 67 is removed, it is realized that the engaging recess 59 is simply placed on the supporting rod 56. As a result, it is possible to pull out the mounting plate 58 forward from a position between the pair of arms 55 to separate the mounting plate 58 from the supporting plate 52. Incidentally, if it is also desirable to dismount the supporting plate 52, it is enough to release the bolts 53 to dismount the supporting plate 52 from the mounts 51. The thus separated mounting plate 58 and supporting plate 52 are then washed to remove the adhered substances adhered thereto. After completion of the washing thereof, the apparatus can be assembled in reverse sequence with respect to the above-mentioned disassembling sequence thereof. Incidentally, each member of the mounting means 50 for the cutting blade 13 subjected to the washing action is made of a stainless steel in order to prevent an occurrence of rust therein.

Figure 6:
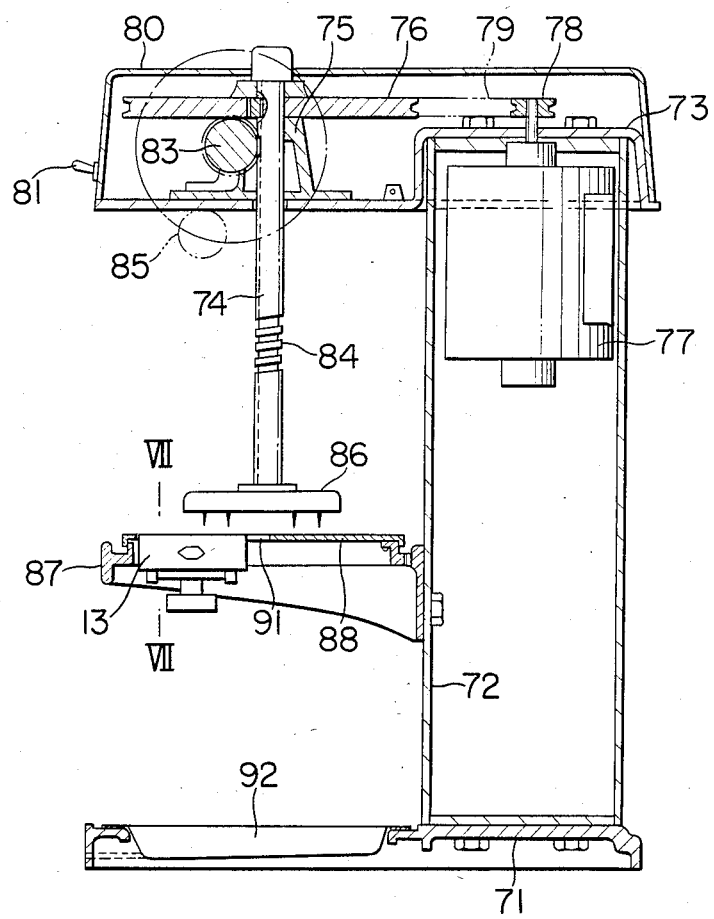
FIG. 6 is a longitudinal sectional view of another example of the food-cutting apparatus to which the mounting means for the cutting blade is applied, a type of which apparatus is different from that of the apparatus shown in FIG. 1.

FIG. 6 shows an example of another type of a conventional food-cutting apparatus to which the mounting means 50 for the cutting blade 13 of the present invention is to be applied. In the food-cutting apparatus incorporated with the mounting means 50 of the present invention, the reference numeral 17 designates a base; 72 designates a supporting frame; 73 designates an upper frame; 74 designates a rotary shaft; 75 designates a bearing for the rotary shaft 74; 76 designates a pulley fixed to an upper end of the rotary shaft 74; 77 designates a driving electric motor; 78 designates a pulley mounted on a shaft of the electric motor 77; 79 designates a belt running under tension round the pulleys 76, 78; 80 designates a head cover; 81 designates a switch; 83 designates a worm wheel engaging with a worm 84 provided on an outer peripheral surface of the rotary shaft 74; 85 designates a handle for manually moving the rotary shaft 74 up and down, which handle 85 is mounted on an axle of the worm wheel 83; 86 designates an ice holder fixed to a lower end of the rotary shaft 74; 87 designates a receiver for a cutting plate 88 which is supported by the receiver 87 which is attached to the supporting frame 72; 91 designates an opening provided in the cutting plate 88; and 92 designates a tray.

Figure 7:
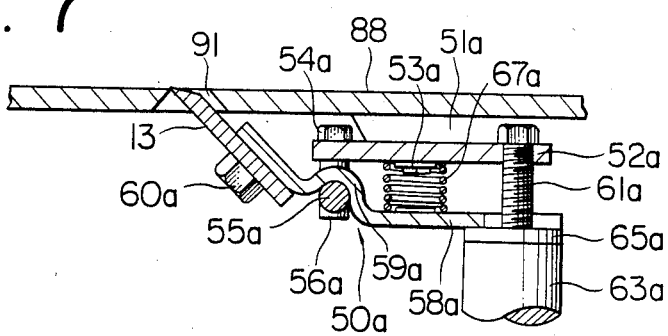
FIG. 7 is an enlarged sectional view taken along the line VII—VII of FIG. 6.

The cutting plate 88 of the food-cutting apparatus as mentioned above is different from the reverse conical-shape cutting plate 11 in that it has a flat-plate shape. As for such cutting plate 88, it is possible to employ the mounting means for the cutting blade of the present invention. FIG. 7 shows this mounting means 50a for the cutting blade, a construction of which mounting means 50a is substantially the same as that of the above-mentioned mounting means 50, and therefore it is enough for a description thereof to add a suffix "a" to like reference numerals which designates like parts corresponding to those of the mounting means 50.

Although a particular preferred embodiment of the present invention has been disclosed in detail for illustrative purposes, it will be recognized that variations or modifications of the disclosed apparatus, including the rearrangement of parts, lie within the scope of the present invention.

What is claimed is:

1. A food-cutting apparatus wherein a cutting blade is disposed on a back surface of a cutting plate so as to protrude its front tip from a opening provided in said cutting plate, characterized in that:

a supporting plate is fixed to said back surface of said cutting plate near said opening; a pair of arms are provided on a reverse side surface of said supporting plate with respect to said cutting plate; between said pair of arms a supporting rod is interposed and axially supported; an engaging recess formed in a middle portion of a mounting plate for said cutting blade is rotatably mounted on said supporting rod in a saddling manner at a side of said supporting rod opposite to said supporting plate, in a front portion of which mounting plate said cutting blade is disconnectably connected; a length of said mounting plate between opposite ends thereof is shorter than that of an interval between said pair of arms; a spring means is interposed between said mounting plate and said supporting plate behind said engaging recess; and an adjusting means for adjusting a protruding amount of said front tip of said cutting blade is disconnectably connected between a rear portion of said mounting plate and said supporting plate.

* * * * *

UNITED STATES PATENT OFFICE
CERTIFICATE OF CORRECTION

PATENT NO. : 4,588,135

DATED : May 13, 1986

INVENTOR(S) : Kohei Himi

It is certified that error appears in the above-identified patent and that said Letters Patent are hereby corrected as shown below:

Delete claim 1 and rewrite as follows:

1. A food-cutting apparatus wherein a cutting blade is disposed on a back surface of a cutting plate and includes a front tip protruding from an opening provided in said cutting plate, characterized in that:

a supporting plate is fixed to said back surface of said cutting plate near said opening; a pair of arms are provided on a side surface of said supporting plate opposite to said cutting plate; between said pair of arms a supporting rod is interposed and axially supported; an engaging recess formed in a middle portion of a mounting plate for said cutting blade is rotatably mounted on said supporting rod opposite to said supporting plate, said cutting blade is disconnectably connected to a front portion of the mounting plate; a length of said mounting plate between opposite ends thereof is shorter than the distance between said pair of arms; a spring means is interposed between said mounting plate and said supporting plate behind said engaging recess;

UNITED STATES PATENT AND TRADEMARK OFFICE
CERTIFICATE OF CORRECTION

PATENT NO. : 4,588,135

DATED : May 13, 1986

INVENTOR(S) : Kohei Himi

It is certified that error appears in the above-identified patent and that said Letters Patent is hereby corrected as shown below:

and an adjusting means for adjusting a protruding amount of said front tip of said cutting blade is disconnectably connected between a rear portion of said mounting plate and said supporting plate.

Signed and Sealed this

Twenty-third Day of September 1986

[SEAL]

Attest:

DONALD J. QUIGG

Attesting Officer

Commissioner of Patents and Trademarks